Patented June 5, 1923.

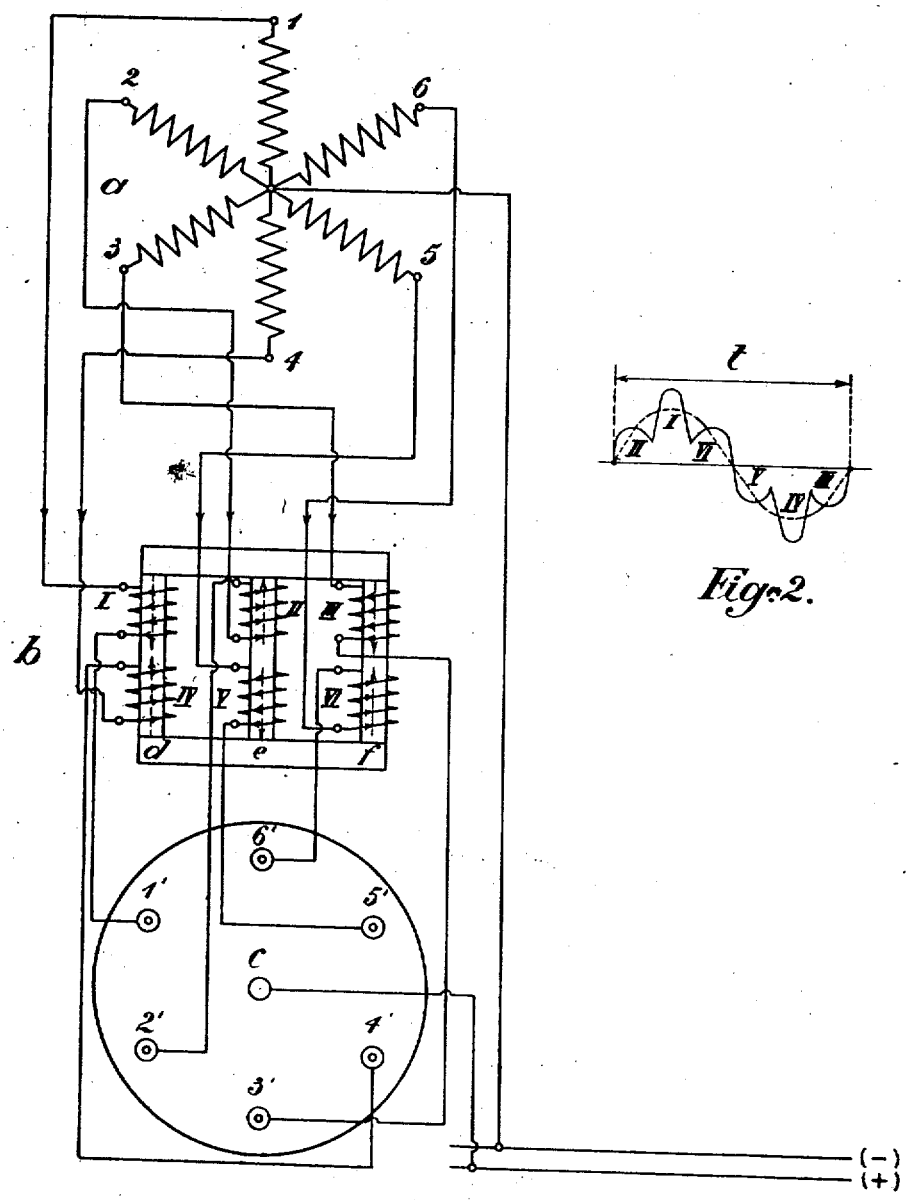

1,457,359

UNITED STATES PATENT OFFICE.

ARTHUR GAUDENZI, OF BADEN, SWITZERLAND, ASSIGNOR TO AKTIENGESELLSCHAFT BROWN BOVERI & CIE., OF BADEN, SWITZERLAND.

SYSTEM OF CONNECTIONS FOR MULTIPHASE CHOKING COILS.

Application filed August 29, 1921. Serial No. 496,560.

*To all whom it may concern:*

Be it known that I, ARTHUR GAUDENZI, a citizen of the Swiss Republic, and residing at No. 7 Martinsbergstrasse, Baden, Switzerland, have invented certain new and useful Improvements in the Systems of Connections for Multiphase Choking Coils (for which I have filed applications in Germany Nov. 28, 1917; Switzerland Nov. 19, 1918; France Nov. 19, 1918; Italy Nov. 27, 1918; Austria Nov. 14, 1918), of which the following is a specification.

In order to generate by means of mercury vapour rectifiers a direct current which will be as free as possible from higher harmonics, it is usual to increase the number of phases of the generating alternating current and to supply a plurality of anodes with this multiphase current, the said anodes corresponding to the number of phases or to a whole multiple thereof. Now in the case of large outputs it is necessary to connect several vapour gaps of the same phase in parallel, this being effected in the same container or by connecting a number of rectifiers in parallel. In order to obtain at the same time reliable operation in parallel of the vapour gaps of the same phase, it has been proposed to interpose ohmic or better still inductive resistances in the individual anode circuits of the rectifier. These resistances have hitherto been mainly constructed separately for each anode in the form of single phase choking coils. It is naturally more practicable however if a multiphase choking coil be provided having a number of limbs with an iron core of the simplest possible construction.

In order to obtain the least possible drop in voltage in the direct current circuit, it has been proved theoretically and by experiment to be preferable to cause the field fluctuations in the iron core of the choking coil to have as nearly as possible a sine form. This problem in connection with choking coils for rectifier operation is different from that of other choking coils, because as is well known, the circuits of the individual anodes connected to different alternating current phases only carry current during a fraction of the periods of the alternating current supplied to them. When the number of phases is greater than three as is usual in the operation of rectifiers, for practical reasons, the windings of at least two phases will be mounted on each limb of the multi-column iron core of the choking coil.

The present invention relates to an arrangement of this type.

The new system of connections accordingly relates to multiphase choking coils having a common iron core and the coils of at least two different phases on each column for the operation of rectifiers, and consists in connecting the parts of the choking coil winding in such a manner that the coils situated on a column will either individually or in groups produce magnetic fluxes in opposed directions in this column in a manner which has already been proposed in German patent specification No. 238,754, more particularly for coils of the same phase mounted on each limb, so that the magnetic flux produced in the same column by coils of the other columns immediately before and after its own magnetization has the same direction as, but smaller ordinates than, the flux induced by its own coils. By this means the time course of the magnetic flux in each column will be approximately in the form of a sine function.

Fig. 1 is a digrammatic view of the improved system of connections for multiphase choking coils showing the manner in which the individual windings of the choking coil must be connected up so as to produce the field distribution for a rectifier supplied with six phase current.

Fig. 2 is a diagram of the flux distribution curve.

Referring to the drawings, *a* represents the six phase secondary portion of the current supplying transformer, the said secondary being connected in star; *b* is the choking coil and *c* the rectifier which sends direct current into the mains "+ —". The six secondary terminals of the transformer *a* are designated 1 to 6, the corresponding six anodes of the rectifier 1' to 6'; between these mounted on an iron core having three columns *d*, *e*, *f*, are the six windings I to VI of the choking coil *b*. The manner in which these coils have to be connected up will be deduced from the flux distribution curve shown in Figure 2. The full line curve represents approximately the time course of the magnetic power flux in the column *d* of the choking coil during a period $t$, it being assumed that this column is magnetized positively by the coil I. The fundamental wave of sine form is superposed in a broken line.

As already mentioned, each coil carries current only during the sixth part of a period, and owing to the action of the rectifier, this current is always in the same direction. In order to obtain a field variation which will be as nearly as possible of sine form, the coil IV, which is situated on the same column $d'$ as the coil I and supplied from the phase 4 of the transformer $a$ which is displaced by 180°, is connected up at the choking coil in the opposite way to the coil I so that the maximum field displaced by 180° will be negative so as to correspond to the sine course. The two-sixths of the curve which in point of time are adjacent the sixth I of the curve, and which are produced by the currents in the coils II and VI of the phases 2 and 6 which are in advance and behind, respectively, by 60°, have ordinates of only about half the size of the sixth I of the curve, because the power fluxes induced in the columns $e$ and $f$ at the moment are closed through two columns ($d$ and $f$, $d$ and $e$, respectively), so that only half the power flux passes through the column $d$ under consideration.

For the purpose of approaching the sine form, the parts II and VI of the curve must at the same time be positive, that is to say, must extend in the direction of the arrow marked in the coil I. The coil II must therefore generate beforehand in the column $e$ a flux which has the direction of the arrow marked on it, while afterwards a flux must be produced in the same direction from the coil VI in the column $f$; both are therefore so connected up (the same sense of winding being presumed for all the coils) that the current flows in the opposite direction to that in coil I. If the same reasoning is adopted for the remaining coils V and III, then the connections to the transformer $a$ shown in Figure 1 will be the result.

From the foregoing it will be evident that in the case of choking coils according to this invention, the coil which magnetizes the iron core will from phase to phase be on a different column, and at the same time the direction of the current in the coils—when the sense of winding is the same—will at the same time alter from one phase to the next following. The new system of connections may also be used with advantage in connection with regulating choking coils and inductive regulators for operating rectifiers.

Having now described my invention what I claim as new and desire to secure by Letters Patent is:—

1. In a system of connections for multiphase choking coils having a common iron core provided with columns and the coils of at least two different phases on each column for the operation of rectifiers, the combination that the coils situated on a column produce therein either individually or in groups magnetic fluxes in opposed directions and the magnetic flux produced in this column by coils of the other columns immediately before and after its own magnetization has the same direction as but smaller ordinates than the flux produced by its own coils in such a manner that the time course of the magnetic flux in each column will be approximately in the form of a sine function.

2. In a system of connections as specified in claim 1, the combination that the coils which magnetize the iron core are from phase to phase situated on a different column and at the same time the direction of current flowing in these coils—when the sense of winding is the same—likewise alters from one phase to the next following.

In testimony whereof I have signed my name to this specification.

ARTHUR GAUDENZI.